3,573,961
METHOD FOR MAKING REFRACTORY OXIDE-COATED MATERIALS
Houston Terry Hawkins, Seneca, S.C., and Donald L. Schmidt, Dayton, Ohio, assignors to the United States of America as represented by the Secretary of the Air Force
No Drawing. Original application Dec. 2, 1964, Ser. No. 415,522. Divided and this application June 28, 1968, Ser. No. 760,369
Int. Cl. B44d 5/12
U.S. Cl. 117—47
14 Claims

ABSTRACT OF THE DISCLOSURE

A method for manufacturing oxide-treated carbonaceous material is provided whereby a carbonaceous fibrous base is immersed in a silica solution, providing a silica coating on the base, which upon drying forms a continuous film. The resulting product is particularly useful in the preparation of composite materials in the form of fiber-reinforced plastic laminates or filament wound fiber-plastic combinations.

---

This application is a division of my application, Ser. No. 415,522, filed Dec. 2, 1964 (now abandoned).

The invention described herein may be manufactured and used by or for the United States Government for governmental purposes without the payment to me of any royalty thereon.

The present invention relates to carbonaceous fibrous materials, to a novel process for imparting improved characteristics thereto and to the incorporation of such fibrous materials in composite fiber-reinforced plastic materials.

From the advent of the electric light bulb in the latter part of the nineteenth century down to the modern day filament wound ablative plastic composite materials, the prior art has increasingly resorted to a variety of carbon-based fibers or filaments which, depending upon the degree and characteristics of the crystallinity thereof, have been commonly known as carbon fibers, partially carbonized fibers or graphite fibers. These have been generally referred to as carbonaceous fibers or filamentous materials. The most recent advancements in such materials have involved the constructive pyrolysis of various man-made synthetic fibers, particularly the regenerated cellulosic fibers such as rayons of the viscose, cuprammonium and saponified acetate types by heating these various precursory materials at temperatures ranging from 300° Fahrenheit all the way up to 7,200° Fahrenheit in reducing or non-oxidizing atmospheres. The prior art has taught a variety of methods for preparing these carbonaceous fibrous materials, and they are available in a variety of physical forms such as continuous or extremely long filaments, short staple-length filaments or whiskers, square, twill and satin woven fabrics, yarn, rovings, cordage, batts, mats, felts, tapes, braided strands, knitted fabrics and the like.

In their most recent stages of development, these carbonaceous fibers have achieved a variety of desirable engineering properties and characteristics such as high thermal stability, light weight, chemical inertness, controllable electrical conductivity, low thermal expansion, thermal shock resistance, nuclear radiation resistance, high surface emittance, non-toxicity, non-flammability and the like. While they have thus become widely used in industrial, military and scientific fields, these carbonaceous fibers have however possessed certain property limitations, particularly restricting their use at elevated temperatures, including a susceptibility to oxidation, high thermal conductivity, relatively low strength, and poor abrasion resistance. Moreover, while these fibers, because of their high carbon content and general refractory capability have become widely used as reinforcements for refractory or high-temperature plastic composite materials, their relatively high oxidation rate and low gas-shear resistance resulting in a high linear erosion rate, have limited their ablative capacity in high speed, hyperthermal, high oxidation potential environments such as are encountered by nose cones and leading edges of high speed atmospheric or aerospace vehicles. While various modifications and treatments of such carbonaceous fibers have improved their suitability as reinforcements for such composite materials, these have not produced optimum performance capabilities, particularly in ablative composite materials. In many cases such modifications have actually interferred with the interfacial bonding of the fibrous reinforcement to the plastic matrix with attendant losses in the strength and dimensional stability of the composite as a whole.

It is accordingly an object of the present invention to provide improved carbonaceous fibers in a variety of physical forms.

Another object of the invention is to provide such fibers which will have improved resistance to oxidative degradation, a low linear ablation rate upon exposure to dynamic shear, low thermal conductivity, high strength and good abrasion resistance at elevated temperatures and will be capable of forming an intimate interfacial bond with resinous materials of the type customarily used in ablative and other laminating and structural applications.

Still another object of the present invention is to provide such fibers with a continuous oxide film.

Still another object of the present invention is to provide methods for the manufacture of such fibers.

Still another object of the present invention is to provide composite ablative or laminated plastic materials reinforced by the improved fibers of the present invention.

To achieve these and other objects and advantages which will appear from a reading of the within disclosure, the present invention teaches the application to the carbonaceous fibrous base of an oxide coating in the form of a continuous film which is intimately associated with the fibrous substrate and completely covers or encapsulates all exposed surfaces including the cavity walls of the micropores opening thereon. Such a continuous film is to be distinguished at the outset from various applications of materials in particulate form which have been practiced in the prior art with the achievement of properties far less desirable than those available as a result of this invention. The advantages heretofore enumerated are particularly achievable where a silica coating is applied to the carbonaceous fibers in the manner described, especially where the fibers, according to well known techniques, are formed in the first instance to be characterized by micro pores opening upon the fiber surface. Whether or not the pores are interconnected with or isolated from each other, the oxide film, in addition to coating the plane of the exterior surface, either coats the interior surfaces of those pores that are open to such planar surface or partially fills such pores so that the continuum is not interrupted. Moreover, it has been found that where a porous carbonaceous substrate is employed, the partial filling of the surface pores represents a mechanical interlocking of the film to the fiber which preserves their integration at high temperatures and under ablative or other abrading or eroding forces to the ultimate prolongation of the useful life of the product.

Additionally, it has been found that where the oxide coating is a silicon dioxide or silica, conventional glass-type finishes may be applied to the oxide coated fibers thereby to improve their "wettability" by such structural, laminating or ablative plastic resins as they are to reinforce with a resultant improvement in the interfacial bond that is ultimately established between the fibers and the plastic, again to the ultimate prolongation of the life of the reinforced composite. These conventional glass finishes may be of either the chrome type such as methacrylate-chromium or the silant type such as vinyl silane or gamma-amino-propyltriethoxysilane.

In the practice of one modification of this invention, a saturated solution of ortho-silicic acid ($H_2SiO_4$) may be prepared by dissolving an excess of powdered ortho-silicic acid in distilled water and allowing the solute and solvent to come to equilibrium and stability with a small excess of the silicic acid solute remaining at the bottom of the container. The amount of solute dissolved is a function of such factors as the solvent (water in one preferred embodiment), the amount thereof, the temperature and the pH of the solution as well as the physical size and nature of the solute particles. At standard conditions the ortho-silicic acid is only slightly soluble in water, e.g., 0.01 gram per 1,000 grams of water at 75° Fahrenheit and a pH of 7.0; but upon heating the solution or increasing its pH, for example by the addition of an alkali such as sodium hydroxide, the amount of solute in solution may be increased. In the mixing, a cloudy appearance should be avoided since this indicates a colloidal suspension which will result in a particle deposition to the detriment of the ultimately desired film continuity.

In the solution thus formed may be immersed the carbonaceous fibers in whatever physical form they may be, and a partial vacuum on the order of from one to twenty millimeters of mercury is created above the surface of the fluid. The effect of the vacuum is to remove gases adhering to the fibers and occupying the surface-opening pores thereof as evidenced by the bubbling of such gases through the solution. This degasification should be continued until all of the absorbed gases are liberated from the fabric and complete wetting of the external surfaces and internal pores with the solution is thereby insured. While the time period necessary to accomplish this may vary with such factors as the degree of the vacuum, the temperature and pH of the solution and the like, it should be continued until no further bubbles are seen to rise from the fabric; and it has been found that a maintenance of the vacuum on the order of fifteen millimeters of mercury for a period of thirty minutes is satisfactory in most cases. After this, atmospheric pressure may be restored to the receptacle and the fabric removed from the bath whereupon the excess water may be volatilized, either by air drying at room temperature or by drying in an air oven at temperatures of less than 90° centigrade, until a constant weight of the finished product is achieved. In the drying process, it is normal that up to two moles of water are removed for each mole of ortho-silicic acid thereby leaving one mole of silica deposited upon the material in the form of a uniform thin film on all of the fiber surfaces originally exposed. Moreover, no silica particles as such appear on these surfaces; and, as indicated above, it has been found that this is an important feature in achieving the results of this invention, it being believed that such particles disrupt the continuity and interfacial bonding of the film either on the surface or at the micro pores opening thereon or both.

In another modification of this invention an aqueous solution of an alkali silicate such as sodium silicate in distilled water may be employed, the amount of the silicate depending upon the desired amount of silica ultimately to be deposited upon the fibrous substrate. Again the silicate solution having a pH of from 10 to 12 is contained in an enclosure wherein the fibrous material may be immersed and a partial vacuum established for the gases adhered to the exposed fiber surfaces. After the substrate material has become thoroughly wetted by this solution, atmospheric pressure may be restored and the material removed, whereupon it may be partially dried in air or at slightly elevated temperatures of less than 200° Fahrenheit. While it still retains a "wet" appearance however, the fabric should be immersed in a weak acid such as phosphoric acid (85% concentration) to fix the silicate solution in the form of a gel. A variety of acidic solutions having a pH of from 1.0 to 5.0 have been found suitable for this fixation, but weak acids have consistently yielded good results, and the indicated phosphoric acid having a pH of 1 has been suitable. After the material is removed from the acid bath, it may be slowly air dried or oven dried at temperatures of less than 200° Fahrenheit to a constant weight product. This drying process slowly removes the excess water from the gelled coating and forms a thin and transparent silica surface on all of the external surfaces of the fibers including the walls of the micro pores opening upon the exterior surface. In many cases it has been found that, while the fabric is immersed in the acidic fixing solution, a vacuum should again be drawn over the solution thereby further to degassify the silicate treated material and to insure that gellation of the silicate in the micro pores of the treated fibers will take place.

In certain applications it is desirable that the fibrous carbon or graphite reinforcing agent contain a minimum of alkali metals such as sodium. Under these circumstances it has been found that washing the gel-coated fibrous material with a dilute aqueous solution of aluminum sulphate prior to the final drying will effectively reduce the sodium content of the silica coating as well as the residual phosphoric acid in the gel. In other applications particularly where ablative or insulative characteristics are sought, it is often desired that composite materials reinforced by carbonaceous fibers have a high missivity and high viscosity in a molten state. To provide the oxides of cobalt and vanadium which are known to be useful additives for achieving these properties, up to several percent of the halogen of the cobalt or vanadium such as cobaltous chloride or vanadic chloride may be added to the acidic treating bath prior to the fixation of the silica gel on the fibrous materials. The amount of metal halide so added may be adjusted to leave a final weight percent of from ½ to 1 percent of the metal in the silica coating so that, upon subsequent heating, the halogen will be converted to the corresponding oxide to increase the thermal emittance and viscosity.

In still another modification of a method for obtaining the new materials according to the present invention, the carbonaceous fibrous reinforcement may be immersed in liquid ethyl ortho silicate which has been found capable of completely wetting the fibrous materials at ambient conditions of temperature and pressure. Thus, after several minutes of soaking, the fibrous material will be completely saturated with the silicate solution and may then be placed in a second treating solution comprising substantially equal volumes of hydrochloric acid (38 weight percent) and anhydrous acetone, these ingredients being mixed with rapid agitation and dissipation of the heat of solution by means of a cold water bath. While the fibrous material is immersed in this solution, hydrogen peroxide (30 weight percent C.P.) is added in dropwise manner and with constant stirring a minor amount of on the order of three volumes to twenty volumes, of each of the hydrochloric and the anhydrous acetone; and an additional minor amount of ethyl ortho silicate, up to one-half of the volume thereof originally mixed, is similarly added. After the fibrous material is allowed to soak ten minutes in this solution, it is removed and dried to constant weight at room temperature and normal atmospheric pressure. It has been found that during this drying step, the uniform thickness of the silica gel is converted to a thin coating of hard silica. As an alternative to this method, the fibrous material may be immersed directly in a solution containing the acid, acetone, hydrogen peroxide and silicate solution without the prior wetting in the separate ethyl ortho silicate solution. While either alternative of this method is obviously more economical and less time consuming than the other embodiments involving the silicic acid or the alkali silicate, the processing ease is somewhat counterbalanced by a nominal loss of uniformity and a lower silica content in the finished film.

In connection with all of the above described procedures, it has been found that improved products, at least from the standpoint of uniformity and reliability may in certain instances be achieved by pre-treating the fibrous material with exposure to high temperatures in the presence of oxygen or steam for several minutes at from 1200° to 1800° Fahrenheit before it is immersed and further processed. Additionally, the fibrous material, once coated with the oxide, may be after-treated by an annealing process involving subjecting the coated fibers to an inert atmosphere at slowly rising temperatures. In an atmosphere of nitrogen gas for example, the oxide-coated fabric may be raised from room temperature to 212° Fahrenheit over a period of forty minutes to vaporize the water from the gel whereupon the temperature may be increased from 212° Fahrenheit to 300° Fahrenheit over a period of thirty minutes and finally raised to a maximum temperature of 2,000° Fahrenheit over a period of one hour. After heat soaking at this elevated temperature for twenty minutes, the temperature may be slowly decreased to room temperature. Where this aftertreatment is employed, it has been found that the surface porosity is reduced.

The fibrous materials provided with the oxide film according to any of the above methods have been characterized by improvements over prior art carbonaceous fibers in the general areas heretofore indicated as objects of the invention. By way of example, the ultimate tensile strength of a non-treated yarn at room temperature was 11.1 pounds; whereas the same yarn with a silica film applied in accordance with either of the ortho-silicic acid or aqueous alkali silicate solution treatments above had an ultimate tensile strength of 12.3 pounds. As a demonstration of the improved oxidation resistance of oxide-treated carbonaceous fabrics, they and similar materials without such treatment were subjected to a temperature of 5,200° Fahrenheit in an air-propane torch. The period necessary to achieve complete burn through of the treated fabric was five times longer than that necesary for burn through of the non-treated control fabric.

Composite materials in the form of fiber-reinforced plastic laminates or filament wound fiber-plastic combinations employing the oxide-coated carbonaceous fibers according to this invention have been made and tested. The fibrous component in such cases has been a carbon or graphite filament or fabric provided with a silica film according to either of the silicic acid or alkali silicate procedures above described; and the plastic matrix component has included a wide variety of resinous materials such as phenolic, epoxy, melamine, furane, polyester, silicone, acrylic, cellulosic, amide, styrene, vinyl, polytetrafluoroethylene, urethane resins and the like within the general classification of plastic resins, whether they be thermosetting, thermoplastic, rigid or elastomeric. Where the filaments or other reinforcing fabrics are silica coated according to any of the above described methods, they may be given a chemical finish of the type and applied in the manner of conventional glass finishes of the chrome or silane types as hereinabove mentioned. Basically, the application of such finishes involves the addition of a minor amount of the finish on the order of from one to five parts by weight to 150 parts by weight of demineralized water and immersing the fibers therein for a period of time of on the order of thirty minutes.

The chemically-finished, silica-treated carbonaceous fabric may then be immersed in a liquid mixture of the plastic material in solution such as in a mixture of phenolic resin and isopropyl alcohol. After the fibers have become thoroughly saturated with the resin, they may be removed and air dried to remove the alcohol diluent to leave what is known in the art as a "prepreg." As an alternative procedure, the prepreg fabric may be produced by brushing the resin-alcohol mixture on both sides of the fibrous material particularly when it is in the from of a fabric or felt. In such prepregs, the plastic matrix component will be applied until it represents from thirty to seventy percent or more by weight of the total composition. The prepreg may be laminated in superimposed plies and subjected to heat and/or pressure, depending upon the type of plastic employed, to yield a final carbonaceous fabric reinforced plastic composite. By modifications of this process well known to the art, filament wound carbonaceous fiber-reinforced plastic composite materials may be obtained incorporating the silica coated fibers of the present invention in continuous filament form. Such composites demonstrate substantial improvements in strength over those which are reinforced by carbonaceous fabrics not treated as taught herein.

As a further example of the improvements imparted by the present invention to composites incorporating the fibers as reinforcing agents, a microablation test specimen was prepared of forty percent phenolic resin and sixty percent silica-treated carbon fabric which itself contained sixteen percent by weight of silica. A control specimen of the same weight of plastic and fiber wherein the fibers did not contain the silica treatment was also prepared; and, using standardized test equipment, both specimens were exposed to a hot air plasma. It required two and one-half times as long for the plasma to penetrate a given depth of the silica treated composite as it did to penetrate the same depth of the composite wherein the fabric was not silica coated. Stated otherwise, the silica-containing composite had a linear erosion rate which was 250 percent less than that of the non-silica-containing test specimen. Moreover, it has been found that even lower ablation rates may be obtained in ablative plastic composites where other finely divided or powdered oxides such as magnesia or zirconia are incorporated in the film coating the carbonaceous material. Improvements of the type provided by this invention are therefore achievable not only by the application of silica coatings to the carbonaceous fibers, but also by the treatment of the same with other refractory oxides, particularly the oxides of the transition metals or the metals of Group IV of the Mendeleovian Periodic Table of Elements.

While the invention has been described in connection with certain preferred embodiments, it is to be understood that the foregoing particularization and detail have been for the purposes of illustration only and are not intended to limit the scope of the invention as it is defined in the subjoined claims.

We claim:

1. A method for the manufacture of an oxide-treated carbonaceous material comprising immersing a fibrous material selected from the group consisting of carbon fibers, partially carbonized fibers, and graphite fibers in an aqueous solution of a compound selected from the group consisting of orthosilicic acid, an alkali silicate and ethyl ortho silicate, said solution being free of colloidal particles; degassing said solution so as to remove gases adhering to said fibrous material; removing said fibrous material from said solution; and drying said fibrous material so as to remove water therefrom and leave silica deposited thereon in the form of a continuous film.

2. A method according to claim 1 in which said solution is degassed by creating a partial vacuum above its surface.

3. A method according to claim 1 in which said fibrous material prior to immersion in said aqueous solution is pretreated by being heated for several minutes in the presence of oxygen or steam at a temperature of from 1200 to 1800° F.

4. A method according to claim 1 in which said fibrous material removed from said solution is dried by heating in an inert atmosphere at a temperature commencing at room and increasing to about 212° F. over a period of about 40 minutes, said latter temperature being maintained for about 20 minutes; thereafter the temperature is raised from about 212° F. to 300° F. over a period of about 30 minutes; the temperature is then raised from about 300° F. to a maximum temperature of 2000° F. over a period of about 1 hour; said fibrous material is maintained at said latter temperature for about 20 minutes; and thereafter the temperature is slowly decreased to room temperature.

5. A method according to claim 1 in which said compound is ortho-silicic acid and an alkali is added to said solution to increase the solubility of said compound.

6. A method according to claim 1 in which said compound is ortho-silicic acid and said fibrous material removed from said solution is dried so as to remove up to two moles of water for each mole of ortho-silicic acid, thereby leaving one mole of silica per mole of ortho-silicic acid deposited on said fibrous material.

7. A method according to claim 1 in which said compound is an alkali silicate, said fibrous material removed from said solution is partially dried; said partially dried fibrous material is immersed in an acid bath having a pH from 1.0 to 5.0; said fibrous material is removed from said acid bath; and said fibrous material having a gelled coating thereon is dried to remove excess water from said coating, thereby forming a transparent, continuous silica film on said fibrous material.

8. A method according to to claim 7 in which a vacuum is maintained on said acid bath to degassify said coated fibrous material.

9. A method according to claim 7 in which said acid is phosphoric acid.

10. A method according to claim 5 in which said coated fibrous material prior to said drying step is washed with a dilute aqueous solution of aluminum sulfate to reduce the alkali metal content and residual acid in said coating.

11. A method according to claim 7 in which cobaltous chloride or vanadic chloride is added to said acid bath prior to immersion therein of said coated fibrous material.

12. A method according to claim 7 in which said alkali silicate is sodium silicate.

13. A method for the manufacture of an oxide-treated carbonaceous material comprising immersing in liquid ethyl ortho silicate a fibrous material selected from the group consisting of carbon fibers, partially carbonized fibers, and graphite fibers; removing said fibrous material from said liquid ethyl ortho silicate, said fibrous material being saturated with said silicate; placing said fibrous material saturated with said silicate in a treating solution comprising a mixture of substantially equal volumes of hydorchloric acid and acetone; adding hydrogen peroxide to said treating solution; adding liquid ethyl ortho silicate to said treating solution; allowing said fibrous material to soak in said treating solution; removing said fibrous material coated with a silica gel from said treating solution; and drying said fibrous material coated with a silica gel, thereby converting said siilca gel to a continuous coating of hard silica.

14. A method for the manufacture of an oxide-treated carbonaceous material comprising immersing a fibrous material selected from the group consisting of carbon fibers, partially carbonized fibers, and graphite fibers in a solution of ethyl ortho silicate in a mixture of substantially equal volumes of hydrochloric acid and acetone, said mixture containing hydrogen peroxide; allowing said fibrous material to soak in said solution; removing said fibrous material coated with a silica gel from said solution; and drying said fibrous material coated with a silica gel, thereby converting said silica gel to a continuous coating of hard silica.

References Cited

UNITED STATES PATENTS

| | | | |
|---|---|---|---|
| 1,809,755 | 6/1931 | King et al. | 23—182X |
| 2,794,002 | 5/1957 | Haensel et al. | 23—182X |
| 2,871,099 | 1/1959 | Ziese | 23—182 |
| 2,921,839 | 1/1960 | Ritter | 23—182 |
| 2,940,830 | 6/1960 | Thornhill | 23—182 |
| 2,989,418 | 6/1961 | Harbaugh | 117—62 |
| 3,120,454 | 2/1964 | Bailey | 117—228 |
| 3,126,296 | 3/1964 | Moutaud | 117—46 |
| 3,245,918 | 4/1966 | Burzynski | 23—182X |
| 3,281,261 | 10/1966 | Lynch | 264—44X |

ALFRED L. LEAVITT, Primary Examiner

W. E. BALL, Assistant Examiner

U.S. Cl. X.R.

23—182; 117—62, 113, 119, 119.6, 169